: US 12,299,423 B2
(45) Date of Patent: *May 13, 2025

(12) United States Patent
Cremeans et al.

(10) Patent No.: US 12,299,423 B2
(45) Date of Patent: *May 13, 2025

(54) INTENT-BASED MACHINE PROGRAMMING

(71) Applicant: Intel Corporation, Santa Clara, CA (US)

(72) Inventors: Brian Cremeans, Hillsboro, OR (US); Marcos Emanuel Carranza, Portland, OR (US); Krishna Surya, Portland, OR (US); Mats Agerstam, Portland, OR (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,524

(22) Filed: Mar. 7, 2022

(65) Prior Publication Data
US 2022/0197611 A1 Jun. 23, 2022

Related U.S. Application Data

(63) Continuation of application No. 16/455,125, filed on Jun. 27, 2019, now Pat. No. 11,269,601.

(51) Int. Cl.
G06F 8/41 (2018.01)
G06F 8/20 (2018.01)
(Continued)

(52) U.S. Cl.
CPC ............ G06F 8/427 (2013.01); G06F 8/22 (2013.01); G06F 8/36 (2013.01); G06F 8/73 (2013.01); G06N 20/00 (2019.01)

(58) Field of Classification Search
None
See application file for complete search history.

(56) References Cited

U.S. PATENT DOCUMENTS 3,243,132 A 3/1966 Taylor et al.
6,624,052 B2 9/2003 Ramkumar et al.
(Continued)

OTHER PUBLICATIONS

Li et al., "Automatically Documenting Unit Test Cases," IEEE, 2016, 12pg. (Year: 2016).*
(Continued)

Primary Examiner — Ryan D. Coyer
(74) Attorney, Agent, or Firm — Hanley, Flight & Zimmerman, LLC

(57) ABSTRACT

Apparatus, devices, systems, methods, and articles of manufacture for intent-based machine programming are disclosed. An example system categorize source code blocks includes a code repository accessor to access a code repository and select a source code block. The example system also includes a signature generator to generate a signature for the source code block, a collateral miner to extract collateral associated with the source code block, and a tokenizer to transform the source code block into tokens. In addition, the example system includes a function assessor to determine a function of the source code block based on the collateral and the tokens and an input/output determiner to determine an input and an output of the source code block based on the collateral and the signature. The example system further includes a tagger to categorize the source code block with the function, input, and output.

21 Claims, 5 Drawing Sheets

(51) Int. Cl.
  G06F 8/36 (2018.01)
  G06F 8/73 (2018.01)
  G06N 20/00 (2019.01)

(56) References Cited

U.S. PATENT DOCUMENTS

| | | | | |
|---|---|---|---|---|
| 6,654,953 | B1* | 11/2003 | Beaumont | G06F 8/423 |
| | | | | 717/130 |
| 8,464,232 | B2* | 6/2013 | Urakhchin | G06F 8/37 |
| | | | | 717/143 |
| 9,043,759 | B1* | 5/2015 | Lininger | G06F 11/3684 |
| | | | | 717/124 |
| 10,048,945 | B1* | 8/2018 | Makkar | G06F 8/33 |
| 11,269,601 | B2 | 3/2022 | Cremeans et al. | |
| 2008/0034357 | A1* | 2/2008 | Gschwind | G06F 8/445 |
| | | | | 717/149 |
| 2012/0222021 | A1* | 8/2012 | Zhao | G06F 8/427 |
| | | | | 717/143 |
| 2014/0173563 | A1* | 6/2014 | Dias | G06F 8/74 |
| | | | | 717/123 |
| 2014/0365994 | A1* | 12/2014 | Vann | G06F 8/36 |
| | | | | 717/106 |
| 2016/0292066 | A1* | 10/2016 | Stevens | G06F 11/3624 |
| 2017/0060540 | A1 | 3/2017 | Allen et al. | |
| 2017/0060555 | A1 | 3/2017 | Allen et al. | |
| 2017/0371629 | A1* | 12/2017 | Chacko | G06F 8/36 |
| 2018/0373507 | A1 | 12/2018 | Mizrahi et al. | |
| 2019/0114157 | A1* | 4/2019 | Makkar | G06F 8/72 |
| 2019/0317743 | A1 | 10/2019 | Cremeans et al. | |
| 2020/0167134 | A1* | 5/2020 | Dey | G06F 8/65 |

OTHER PUBLICATIONS

Allamanis et al., "A Survey of Machine Learning for Big Code and Naturalness," ACM, 2018. (Year: 2018).*

Tufano et al., "On Learning Meaningful Code Changes via Neural Machine Translation," IEEEm Jan. 2019. (Year: 2019).*

Campbell et al., "NLP2Code: Code Snippet Content Assist via Natural Language Tasks," IEEE, 2017, 5pg. (Year: 2017).*

Desai et al., "Program Synthesis using Natural Language," ACM, 2016, 12pg. (Year: 2016).*

Price et al., "NaturalJava: A Natural Language Interface for Programming in Java," ACM, 2000, 5pg. (Year: 2000).*

Yin et al., "A Syntactic Neural Model for General-Purpose Code Generation," arXiv, 2017, 14pg. (Year: 2017).*

Fertalj, Kresimir et al, "Source Code Generator Based on a Proprietary Specification Language, Proceedings of the 35th Hawaii International Conference on System Sciences," 2002, 2 pages. (Abstract only provided).

Das, Subhasis and Shah, Chinmayee, "Contextual Code Completion Using Machine Learning," 2015, pp. 1-6, Stanford University.

Novak, Gordon, "Computer aided software design via inference and constraint propagation," 2009, 2 pages, Integrated Computer-Aided Engineering, University of Texas. (Abstract only provided).

Eclipse, https://www.eclipse.org/recommenders/manual/, retrieved Jun. 24, 2019, 13 pages.

Pycharm, https://www.jetbrains.com/help/pycharm/auto-completing-code.html, "Code Completion," retrieved Jun. 24, 2019, 11 pages.

Kite, https://kite.com/, "Code Faster in Python," retrieved Jun. 24, 2019, 2 pages.

Balog, Matej, Gaunt, Alexander, L et al, "DeepCoder: Learning to write programs," 2017, pp. 1-20, ICLR.

Aylien, http://blog.aylien.com/source-code-classification-using-deep-learn- ing/, "Source Code Classification," 2016, retrieved Jun. 24, 2019, 15 pages.

Allamanis and Sutton, "Mining Source Code Repositories at Massive Scale using Language Modeling," http://homepages.inf.ed.ac.uk/csutton/publications/msr2013.pdf, retrieved Jun. 24, 2019, 10 pages.

Bhoopchand, Tocktaschel, Barr, and Riedel, "Learning Python Code Suggestion with a Sparse Pointer Network," 2017. pp. 1-11, ICLR.

Bottou, Leon, "From Machine Learning to Machine Reasoning," 2011, 15 pages.

Allamanis and Sutton, "Mining Idioms from Source Code," retrieved Jun. 24, 2019, 12 pages.

European Patent Office, "Extended Search Report," issued in connection with EP Patent application No. 20166259.0, dated Nov. 24, 2020, 12 pages.

Ben Gelman et al, "A Language-Agnostic Model for Semantic Source Code Labeling", arxiv.org, Cornell University Library, 201 Olin Library Cornell University Ithaca, NY 14853, (Jun. 3, 2019), doi: 10.1145/3243127.3243132, XP081372439 [A] 12 pages.

Howard Matthew J et al, "Automatically mining software-based, semantically-similar words from comment-code mappings", 2013 10th Working Conference on Mining Software Repositories (MSR), IEEE, doi:10.1109/MSR.2013.6624052, ISSN 2160-1852, ISBN 978-1-4799-0345-0, (May 18, 2013), 10 pages.

United States Patent and Trademark Office, "Non-Final Office Action," issued in connection with U.S. Appl. No. 16/455,125, dated Jan. 7, 2021, 10 pages.

United States Patent and Trademark Office, "Final Office Action," issued in connection with U.S. Appl. No. 16/455,125, dated Jun. 24, 2021, 8 pages.

United States Patent and Trademark Office, "Notice of Allowance and Fee(s) Due," issued in connection with U.S. Appl. No. 16/455,125, dated Oct. 29, 2021, 7 pages.

United States Patent and Trademark Office, "Corrected Notice of Allowability," issued in connection with U.S. Appl. No. 16/455,125, dated Nov. 8, 2021, 6 pages.

European Patent Office, "Communication pursuant to Article 94(3) EPC," issued in connection with European Patent Application No. 20166259.0, dated Aug. 3, 2022, 8 pages.

European Patent Office, "Extended European Search Report," issued in connection with European Patent Application No. 22194614.8, dated Dec. 21, 2022, 11 pages.

European Patent Office, "Communication under Rule 71(3) EPC Intention to Grant," issued in connection with European Patent Application No. 20166259.0, dated Jan. 5, 2023, 9 pages.

Chatterjee et al., "Sniff: A Search Engine for Java Using Free-Form Queries," SAT 2015 18th International Conference, Mar. 22, 2009, 16 pages.

Gu Xiaodong et al., "Deep code search," 2018 ACM/IEEE 40th International Conference on Software Engineering, May 27, 2018, 12 pages.

European Patent Office, "Communication pursuant to Article 94(3) EPC," issued in connection with European Patent Application No. 22 194 614.8-1203, dated Mar. 28, 2024, 7 pages.

European Patent Office, "Communication pursuant to Article 94(3) EPC," issued in connection with European Patent Application No. 22 194 614.8-1203, mailed on Feb. 7, 2025, 7 pages.

* cited by examiner

INTENT-BASED MACHINE PROGRAMMING

RELATED APPLICATIONS

This patent arises from a continuation of U.S. patent application Ser. No. 16/455,125, (now U.S. Pat. No. 11,269,601) which was filed on Jun. 27, 2019. U.S. patent application Ser. No. 16/455,125 is hereby incorporated herein by reference in its entirety. Priority to U.S. patent application Ser. No. 16/455,125 is hereby claimed.

FIELD OF THE DISCLOSURE

This disclosure relates generally to machine programming, and, more particularly, to intent-based machine programming.

BACKGROUND

Machine programming is typically performed by a human writing lines of source code. Developments in automatic code generation typically has been very limited. Known automatic code generation simply matches the syntax of partially typed code.

BRIEF DESCRIPTION OF THE DRAWINGS

The figures are not to scale. In addition, in general the same reference numbers will be used throughout the drawing(s) and accompanying written description to refer to the same or like parts.

DETAILED DESCRIPTION

Figure 1:
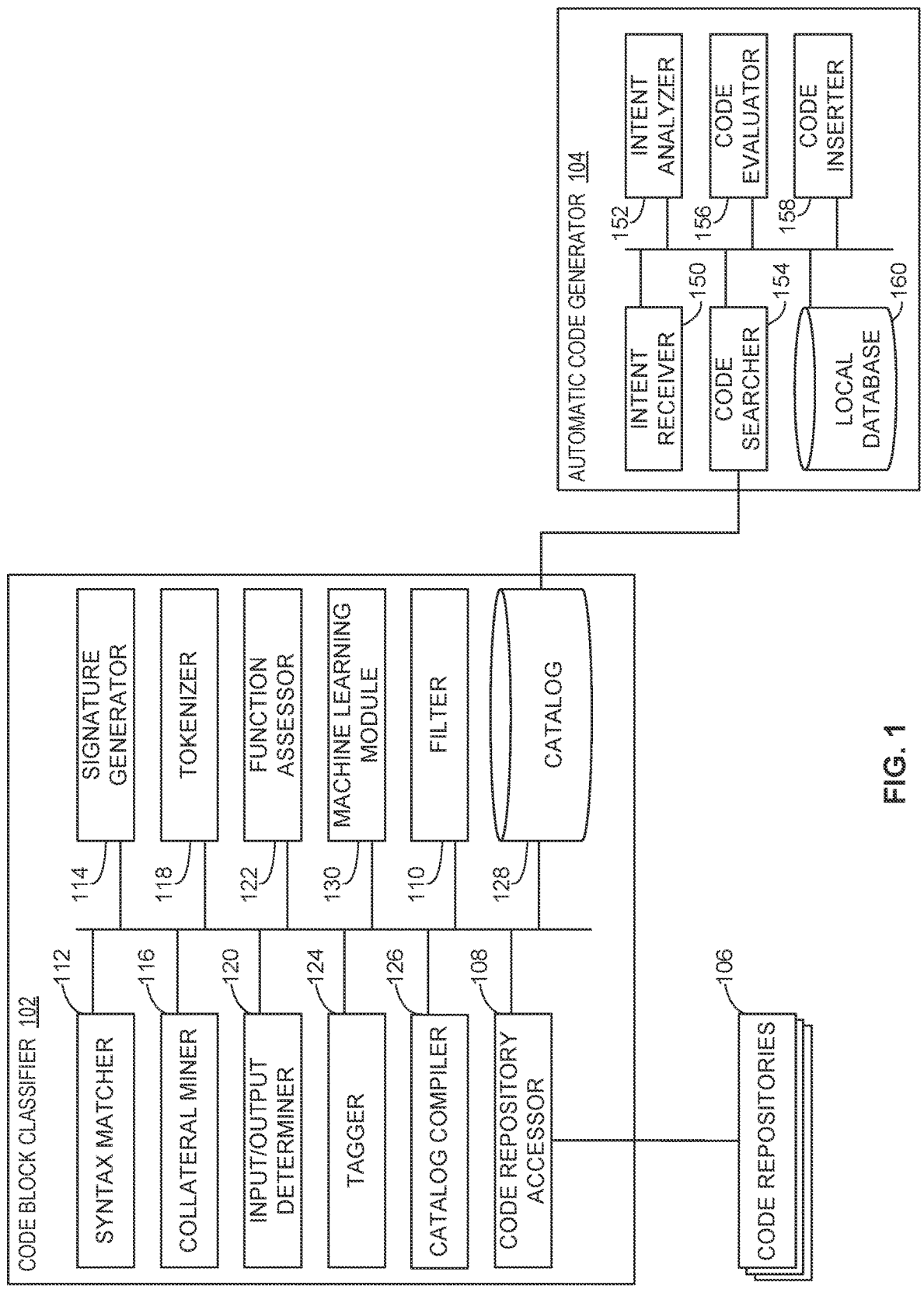
FIG. 1 is a schematic illustration of an example system to categorize source code blocks and automatically generate source code in accordance with the teachings of this disclosure.

To advance machine programming from strictly human-generated code, different models and/or templates can be used in an integrated development environment (IDE) or other automated systems that access libraries, catalogs, or repositories of code such as, for example, GitHub®. The models can retrieve different code blocks from the repositories to combine with human-generated code, machine-retrieved code, or machine-generated code. Throughout this disclosure the terms code and source code are used interchangeably.

Recent efforts to create machine programming have used different methods to predict code. One example analyzes the language or syntax of portions of human-generated code and attempts to match source code blocks from a repository based on the language. In other examples, reference software frameworks are analyzed to suggest application program interfaces (APIs) based on partially typed source code. The predictive methods do not account for the intent of the programmer nor do these methods typically complete more than syntax and/or names. These methods also do not incorporate collateral nor correlate intent with source code function.

Disclosed herein are example systems, apparatus, articles or manufacture, and methods that leverage code repositories, including community or institutional repositories, and associated development collateral as a resource for machine programming. Code repositories include source code blocks that are mostly functional that have defined functions with limited side effects. The source code blocks also have collateral that define the expected behavior, input, and output of such functions. In some examples, the collateral includes tests and documentation including, for example, unit tests, functional tests, asserts, documents, docstrings, comments, etc.

In the examples disclosed herein, the resources for machine programming enable intent-based programming that identify source code blocks for generation or insertion that satisfy the intent of the programmer. The examples disclosed herein allow machine programming systems, once given intent of a programmer, to leverage the repository of source code blocks to autonomously solve problems. This enables more natural human-coding interactions. This also enables machines to accomplish tasks that can be automatically identified.

As understood in this disclosure, a "programmer" is an entity with an intent to solve a problem. This could be a human coder, a machine recognizing a need, or other entity that owns the intent of the action to be programmed.

As understood in this disclosure, "intent" is the work that is desired to be done by the programmer. The intent can be a desired function.

As understood in this disclosure, "mostly functional" describes a function, method, process, or source code block that has no or limited side effects. An input is taken in and an output is returned without altering the state of the surrounding system. Microservices and many constructs in functional languages often assume mostly functional structure.

As understood in this disclosure, "collateral" are software development artifacts that reference the source code. Collateral includes API spec, unit tests, functional tests, asserts, comment blocks, documentation blocks, other maintained documentation, and/or other examples disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

FIG. 1 is a schematic illustration of an example system 100 to categorize source code blocks and automatically generate source code in accordance with the teachings of this disclosure. The system 100 includes an example code block classifier 102, an example automatic code generator 104, and one or more example code repositories 106. The code repositories may be, for example, community, institutional or other types of repositories that include a plurality of source code blocks.

The code block classifier 102 includes an example code repository accessor 108, an example filter 110, an example syntax matcher 112, an example signature generator 114, an example collateral miner 116, an example tokenizer 118, an example input/output determiner 120, an example function assessor 122, an example tagger 124, an example catalog compiler 126, an example catalog 128, and an example machine learning module 130.

The code repository accessor 108 accesses one or more of the code repositories 106 and crawls or searches through the code repository 106 to obtain a source code block for analysis and categorization. In some examples, the filter 110 filters the source code blocks of the code repository 106. The source code blocks may be filtered using metadata or other tags associated with the source code blocks to reduce the volume of source code blocks searched. The filtering can be targeted, for example, toward specific subject matter or any other parameter or characteristic. In some examples, the filter 110 filters for source code blocks that have not been categorized. In some examples, the filter 110 filters source code blocks based on a date the source code blocks were added to the repository 106. The code repository accessor 108 selects a source code block from the filtered subset of source code blocks.

In some examples the syntax matcher 112 analyzes the source code block selected by the code repository accessor 108 and categorizes the source code block based on the syntax of the source code block. In some examples, the syntax matcher 112 categorizes the source code block based on other elements of the language, punctuation, and/or indentation patterns of the text of the source code block.

The code block classifier 102 also categorizes the source code block based on the function of the source code block. The function of a source code block is a property of the source code block that describes what action or work is performed by the source code block on an input to produce an output. Several properties can be used, in some examples, to determine function, input, and/or output including, for example a signature of the source code block, collateral of the source code block, and tokens generated from the source code block.

The signature generator 114 analyzes the source code block selected by the code repository accessor 108 and generates a signature of the source code. In some examples, a signature is a name and a parameter-type-list of one or more of a function, a class, a concept, a concept map, and/or a namespace. In some examples, if a function or function template is a class member, its signature additionally includes cv-qualifiers (if any) and ref-qualifier (if any) on the function or function template itself. In some examples, a signature of a constrained member includes its template requirements. In some examples, a signature of a function template additionally includes its return type, its template parameter list, and its template requirements (if any). In some examples, a signature of a function template specialization includes the signature of the template of which it is a specialization and its template arguments (whether explicitly specified or deduced). The signature provides entry and exit conditions of the source code block and gives hints or inferential clues as to the intended operation of the source code block. The signature also establishes requirements for using the source code block. In some examples, the requirements are the type of data expected as an input to the source code block and parameters of use or operation. Thus, the input and output requirements of the function may be parsed from the signature.

The collateral miner 116 extracts collateral from the source code block selected by the code repository accessor 108. Collateral such as, for example, unit tests and function tests define expected input, expected output, and details of the function and/or expected behavior of the source code block. Unit tests run through a set of inputs, provide the function, and check the outputs. Inferable from this logic, and documented in the docstring, are sets of inputs and outputs that provided successful testing and sets of input and outputs that resulted in failures.

Collateral including, for example, linked documents, comments, and/or docstring type artifacts inform to the details of the function the source code block performs on input to produce output. Natural Language Processing (NLP) may be used to parse and extract descriptions of the source code block from the collateral. In some examples, idiom detection is used to analyze the collateral.

The tokenizer 118 decomposes or transforms the source code block selected by the code repository accessor 108 into tokens. The tokens are the individual elements of the source code block and can be words, keywords, phrases, symbols, and/or other elements. Keyword tokens are words whose meaning are already defined by the programming language. The tokens may be used to parse the signatures. The tokens also facilitate detection of the language of the source code block. Some tokens are identifiers that are names given to variables or functions of the programming element. Some tokens are operators that are the symbols given to arithmetical or logical operations. Some tokens are separators, which separate the different programming elements. An example separator is a space. Some tokens are literals, which are constant values used in the operations of the source code block.

The input/output determiner 120 determines the input and the output of the source code block using the signature and the collateral. In addition, the function assessor 122 determines the function of the source code block using the collateral and the tokens. In some examples, the collateral used by the input/output determiner 120 includes unit tests. In other examples, other collateral is used. Also, in some examples, the collateral used by the function assessor includes unit tests and documentation. In other examples, other collateral and/or combinations of collateral is used.

The tagger 124 tags or categorizes the source code block with the function, input, and output. The catalog compiler 126 adds the categorized source code block to the catalog 128. The catalog 128 may be used to store the source code block with the categorization tags of the function, input, and output, and/or other data for use by the code block classifier 102. In some examples, prior categorizations and details of the analysis of the syntax matcher 112, signature generator 112, collateral miner 116, tokenizer 118, input/output determiner 120, and/or function assessor 122 are stored in the catalog 128 for use in machine learning applications to facilitate subsequent and/or automated categorization of source code blocks.

The volume of source code blocks stored in the code repositories 106 can be very high. In some examples, the machine learning module 130 facilitates the classification of the source code blocks in view of the large volumes of data. The machine learning module 130 applies artificial intelligence processes. Artificial intelligence, including machine learning, deep learning, and/or other artificial machine-driven logic, enables machines (e.g., computers, logic circuits, etc.) to use a model to process input data to generate an output based on patterns and/or associations previously learned by the model via a training process. For example, the model may be trained with data to recognize patterns and/or associations and follow such patterns and/or associations when processing input data such that other input(s) result in output(s) consistent with the recognized patterns and/or associations.

In general, implementing a machine learning/artificial intelligence system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of machine learning or artificial intelligence model and/or the expected output. For example, supervised training uses inputs and corresponding expected (e.g., labeled) outputs to select parameters (e.g., by iterating over combinations of select parameters) for the machine learning or artificial intelligence model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the machine learning or artificial intelligence model (e.g., without the benefit of expected (e.g., labeled) outputs).

Training is performed using training data. In examples disclosed herein, the training data originates from the collateral. Also, in some examples, the training data incorporates combinations of collateral, the source code, and/or objects generated from the source code. Once training is complete, the model is deployed for use as an executable construct that processes an input and provides an output based on the network of nodes and connections defined in the model. In this example, the model recognizes patterns in the collateral and can automatically categorize a source code block based on the recognized patterns. The model is stored at the catalog 128. The model may then be executed by the machine learning module 130.

Once trained, the deployed model may be operated in an inference phase to process data. In the inference phase, data to be analyzed (e.g., live data) is input to the model, and the model executes to create an output. This inference phase can be thought of as the artificial intelligence "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the artificial intelligence model to transform the output into a useful result (e.g., a display of data, an instruction to be executed by a machine, etc.).

In one example classification, the code block classifier 102 analyzes source code block that can be used to sort and factor an array of integers. An example source code block includes:

```
array(int) factor(long x){
    """
    Function takes in a long integer and factors, returning the
    factors in an array of integers
    """
    # code to factor quickly
    return array_of_factors
}
```

In this example, the syntax matcher 112 matches the terminology in the source code block such as, for example, "array" and "factor" and "integer." The signature generator 114 generates a signature of, for example array(int) factor (long x). The collateral miner 116 analyzes the docstring in this example, which is the text appearing between the sets of quotation marks. In this example, the docstring indicates the input is a long integer. The docstring indicates that the work performed on the input or the function is the factoring of the long integer and organizing the results into an array. The docstring indicates that the output of the source code block is an array of integers of the factors. Natural language processing including machine learning techniques such as, for example, Convolutional Neural Network or Recurrent Neural Network can be used to interpret and analyze the docstring and/or other collateral.

The tokenizer 118 separates the source code block into tokens of each individual elements of the code. The tokenization may be a coarse tokenization, a compiler tokenization, etc. For example, the tokenizer 118 separates the source code block into:

```
Token "array"
Token "("
Token "int"
Token ")"
Token "factor"
Token "("
Token "long x"
Token ")"
etc.
```

The input/output determiner 120 and the function assessor 122 use the data from the signature generator 114, collateral miner 116, and tokenizer 118, as disclosed above, to determine the input, function, and output of the source code block. The analysis of the syntax matcher 112, input/output determiner 120 and/or the function assessor 122 are used by the tagger 124 and the catalog compiler 126 to categorize the source code block.

In some examples, the code repository accessor 108 and/or the filter 110 implements means for selecting a source code block. The selecting means may be implemented by a processor such as the processor 412 of FIG. 4 executing instructions such as the instructions of FIG. 2. In some examples, the signature generator 114 implements means for generating a signature. The generating means may be implemented by a processor such as the processor 412 of FIG. 4 executing instructions such as the instructions of FIG. 2. In some examples, the collateral miner 116 implements means for mining collateral. The mining means may be implemented by a processor such as the processor 412 of FIG. 4 executing instructions such as the instructions of FIG. 2. In some examples, the tokenizer 118 implements means for tokenizing source code. The tokenizing means may be implemented by a processor such as the processor 412 of FIG. 4 executing instructions such as the instructions of FIG. 2. In some examples, the function assessor implements means for determining a function of a source code block. The function determining means may be implemented by a processor such as the processor 412 of FIG. 4 executing instructions such as the instructions of FIG. 2. In some examples, the input/output determiner 120 implements means for determining an input and an output of a source code block. The input and output determining means may be implemented by a processor such as the processor 412 of FIG. 4 executing instructions such as the instructions of FIG. 2. In some examples, the tagger 124 and/or catalog compiler 126 implement means for categorizing a source code block. The categorizing means may be implemented by a processor such as the processor 412 of FIG. 4 executing instructions such as the instructions of FIG. 2.

On the programming side, the system 100 includes the automatic code generator 104 that searches the catalog 128 to automatic generate or identify source code blocks to insert into a source code created by the programmer to satisfy an intent of the programmer. In this example, the automatic code generator 104 includes an example input receiver 150, an example intent analyzer 152, an example code searcher 154, an example code evaluator 156, an example code inserter 158, and an example local database 160.

The intent receiver 150 receives an intent of the programmer. In some examples the intent is received by the intent receiver 150 directly from a human programmer identifying the intent. In some examples, intent is inferred from the IDE or other interaction window. The intent can be inferred by parsing input of a programmer to detect what the programmer wants to occur. For example, in a mapping function, the intent can be inferred to scale or overlay portions of a map. In some examples, intent is automatically determined using machine learning, based on a device environment, etc. For example, in an automobile, intent to tune a device in the engine can be determined based on measurements obtain from the automobile. In another example, data related to the location of a mobile phone may automatically trigger intent to perform a task. In another example, intent to analyze an image may be automatically determined from an input of video data. In another example, an autonomous system, which acts as the programmer, specifies the intent the autonomous system wants to satisfy.

The intent analyzer 152 identifies a function that can accomplish or satisfy the intent. For example, the intent analyzer 152 analyzes the intent and identifies a desired function. The desired function is the work or operations to perform on the input to deliver output that will satisfy the intent.

The code searcher 154 is communicatively coupled to the catalog 128. The code searcher 154 searches the tagged source code blocks in the catalog 128 to match input, output, and function with the input, output, and desired function identified from the intent. The code searcher 154 identifies a candidate source code block to fulfill the intent.

The code evaluator 156 analyzes the candidate source code block to determine if the input, output, and function matches the criteria established by the intent. If the features of the candidate source code block match the criteria of the intent, the code inserter 158 generates the source code block or inserts the source code block into the source code being developed by the programmer. The source code block may be stored in the local database 160 with an indication or other association with the intent.

If the code evaluator 156 determines that the candidate source code block does not match the criteria of the intent, the code searcher 154 searches the catalog 128 for one or more additional candidate source code blocks to satisfy the intent. The code evaluator 156 again determines if the features of the candidate source code block match the criteria of the intent. The code evaluator 156 may also determine if the additional source code blocks partially satisfy the intent. The source code blocks partially satisfy the intent when, for example, that one or two of the input, function, and output may match the criteria established by the intent, and one or two of the input, function, and output may not match the criteria established by the intent.

If the code evaluator 156 determines that a candidate source code block partially matches the criteria the intent, the candidate source code block may be selected for insertion into the source code. In this example, the code searcher 154 searches the catalog 128 for supplemental source code that matches those elements of the candidate source code block that do not satisfy the criteria of the intent. For example, an intent may include sorting an array of integers, for example, in an ascending or descending order. In this example, the input is an array of integers, the function is sorting the array, and the output is an array of sorted integers. The code searcher 154 may identify a candidate source code block that sorts an array of floating point numbers, not integers. Thus, this source code block matches the function of sorting, though the input and output are different. This source code block may be the source code block in the catalog 128 closest to satisfying the intent, but the match is not perfect. In this example, the candidate source code block may be selected, and then the code searcher 154 searches the catalog 128 for additional source code blocks that can transform the data so that the input and output will also match the criteria of the intent. The additional source code block is supplemental source code block.

As noted above, there are examples in which an autonomous system, acting as the programmer, specifies the intent the autonomous system wants to satisfy. For example, the autonomous system may find a partial match of source code to complete a function, such as for example, a function that operates on longs instead of standard integers. The autonomous system then searches for a way to satisfy this new intent, converting from integers to longs. It was never the original specified intent to make that conversion, it was a need (or intent) derived by the automated system. Thus, the examples with partial matching of functions may lead to subsequent or additional specifications of intent.

When the a partially matching candidate source code block is selected, the code inserter 158 generates or inserts the partially matching candidate source code block and the supplemental source code block into the source code written by the programmer. The candidate source code block and supplemental source code block combination may be stored in the local database 160 with an association to the received intent.

In some examples, the intent receiver 150 implements means for receiving an intent of a programmer. The receiving means may be implemented by a processor such as the processor 512 of FIG. 5 executing instructions such as the instructions of FIG. 3. In some examples, the intent analyzer 152 implements means for analyzing an intent. The analyzing means may be implemented by a processor such as the processor 512 of FIG. 5 executing instructions such as the instructions of FIG. 3. In some examples, the code searcher 154 implements means for identifying a candidate source code from a repository. The identifying means may be implemented by a processor such as the processor 512 of FIG. 5 executing instructions such as the instructions of FIG. 3. In some examples, the code evaluator implements means for evaluating a source code block. The evaluating means may be implemented by a processor such as the processor 512 of FIG. 5 executing instructions such as the instructions of FIG. 3. In some examples, the code inserter 158 implements means for inserting a source code block. The inserting means may be implemented by a processor such as the processor 512 of FIG. 5 executing instructions such as the instructions of FIG. 3.

While an example manner of implementing the code block classifier 102 and the automatic code generator 104 is illustrated in FIG. 1, one or more of the elements, processes, and/or devices illustrated in FIG. 1 may be combined, divided, re-arranged, omitted, eliminated, and/or implemented in any other way. Further, the example code repository accessor 108, the example filter 110, the example syntax matcher 112, the example signature generator 114, the example collateral miner 116, the example tokenizer 118, the example input/output determiner 120, the example function assessor 122, the example tagger 124, the example catalog compiler 126, the example catalog 128, the example machine learning module 130, the example intent receiver 150, the example intent analyzer 152, the example code searcher 154, the example code evaluator 156, the example code inserter 158, the example local database 160, and/or, more generally, the example code block classifier 102 and/or the example automatic code generator 104 of FIG. 1 may be implemented by hardware, software, firmware, and/or any combination of hardware, software, and/or firmware. Thus, for example, any of the example code repository accessor 108, the example filter 110, the example syntax matcher 112, the example signature generator 114, the example collateral miner 116, the example tokenizer 118, the example input/output determiner 120, the example function assessor 122, the example tagger 124, the example catalog compiler 126, the example catalog 128, the example machine learning module 130, the example intent receiver 150, the example intent analyzer 152, the example code searcher 154, the example code evaluator 156, the example code inserter 158, the example local database 160, and/or, more generally, the example code block classifier 102 and/or the example automatic code generator 104 could be implemented by one or more analog or digital circuit(s), logic circuits, programmable processor(s), programmable controller(s), graphics processing unit(s) (GPU(s)) (including GPU hardware 411), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example code repository accessor 108, the example filter 110, the example syntax matcher 112, the example signature generator 114, the example collateral miner 116, the example tokenizer 118, the example input/output determiner 120, the example function assessor 122, the example tagger 124, the example catalog compiler 126, the example catalog 128, the example machine learning module 130, the example intent receiver 150, the example intent analyzer 152, the example code searcher 154, the example code evaluator 156, the example code inserter 158, the example local database 160, the example code block classifier 102, and/or the example automatic code generator 104, is/are hereby expressly defined to include a non-transitory computer readable storage device or storage disk such as a memory, a digital versatile disk (DVD), a compact disk (CD), a Blu-ray disk, etc. including the software and/or firmware. Further still, the example code block classifier 102 and/or the example automatic code generator 104 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
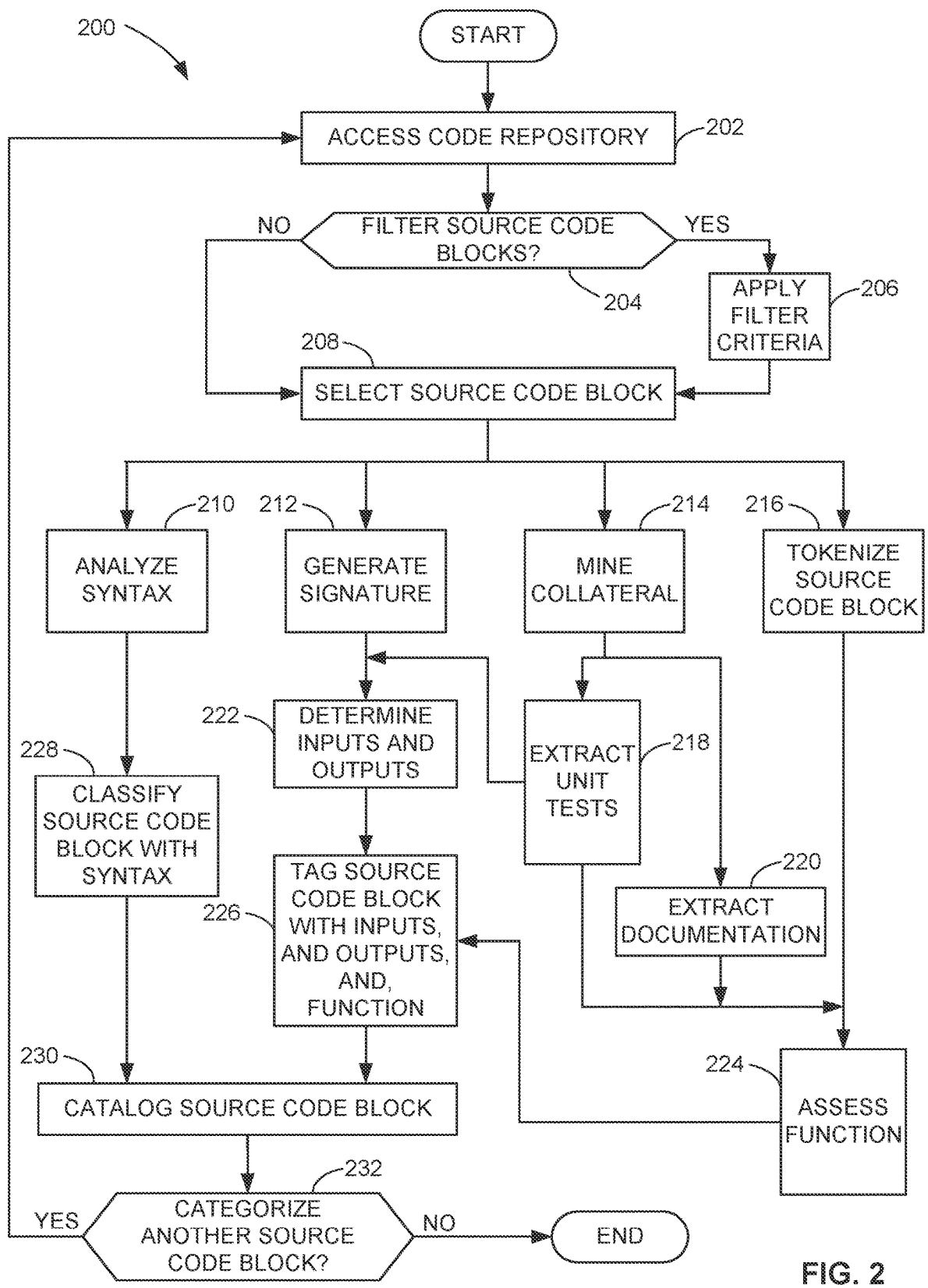
FIG. 2 is a flowchart representative of machine readable instructions which may be executed to implement the example code block classifier of FIG. 1.
Figure 3:
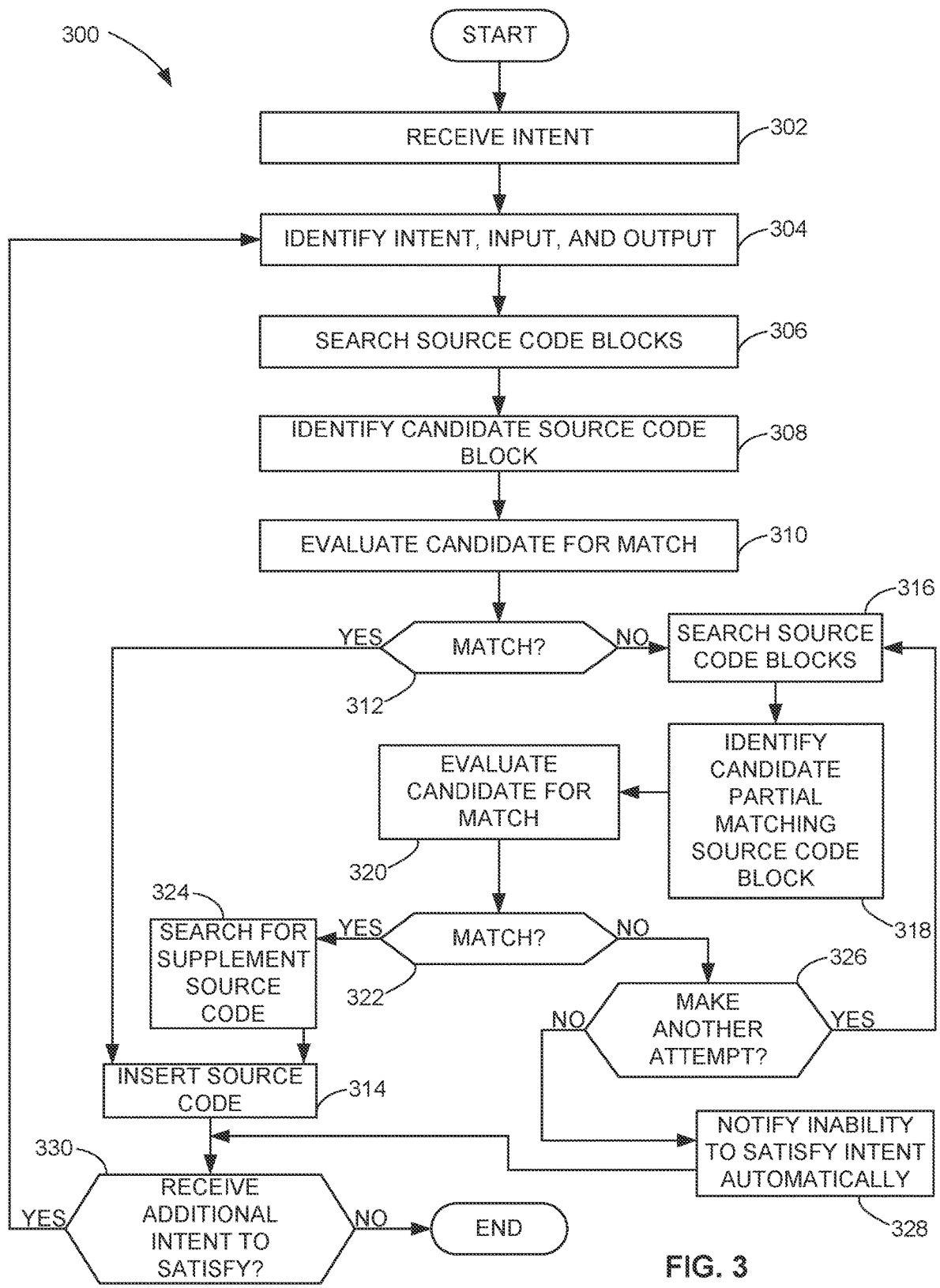
FIG. 3 is a flowchart representative of machine readable instructions which may be executed to implement the example automatic code generator of FIG. 1.

A flowchart representative of example hardware logic, machine readable instructions, hardware implemented state machines, and/or any combination thereof for implementing the example code block classifier 102 of FIG. 1 is shown in FIG. 2. In addition, a flowchart representative of example hardware logic, machine readable instructions, hardware implemented state machines, and/or any combination thereof for implementing the example automatic code generator 104 of FIG. 1 is shown in FIG. 3. The machine readable instructions may be one or more executable programs or portion(s) of an executable program for execution by a computer processor such as the processor 412, 512 shown in the example processor platform 400, 500 discussed below in connection with FIGS. 4 and 5. The programs may be embodied in software stored on a non-transitory computer readable storage medium such as a CD-ROM, a floppy disk, a hard drive, a DVD, a Blu-ray disk, or a memory associated with the processor 412, 512, but the entire program and/or parts thereof could alternatively be executed by a device other than the processor 412, 512 and/or embodied in firmware or dedicated hardware. Further, although the example program is described with reference to the flowcharts illustrated in FIGS. 4 and 5, many other methods of implementing the example code block classifier 102 and/or the example automatic code generator 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device, and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 2 and 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B.

Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 shows an example program 200 for classifying a source code block. In the program 200 of FIG. 2, the code repository accessor 108 of the code block classifier 102 accesses the code repository 106 (block 202). The filter 110 determines whether the source code blocks in the code repository 106 are filtered (block 204). The source code blocks may be filtered to facilitate searching for a specific type of source code block. In some examples, the source code blocks are filtered to identify new source code blocks that have been added to the repository 106 that have not yet been categorized. If the source code blocks are to be filtered (block 204), the filter 110 applies the filter criteria to the source code blocks (block 206). After the filter is applied (block 206) or if no filter is to be applied (block 204), the code repository accessor 108 selects a source code block for categorization (block 208).

With the source code block selected, the code block classifier 102 analyzes the source code block to determine elements or characteristics of the source code block. For example, the syntax matcher 112 analyzes the syntax of the source code block (block 210). The signature generator 114 generates a signature of the source code block (block 212). The collateral miner 116 mines the source code block for collateral (block 214). The tokenizer 118 apportions the source code block into tokens (block 216).

In some examples, the collateral miner 116 mines the source code blocks for a first type of collateral and a second type of collateral. In some examples, the collateral miner 116 mines the source code blocks for additional types of collateral. The example program 200 includes the collateral miner 118 mining the source code blocks to extract unit tests (block 218) and to extract documentation (block 220).

The input/output determiner 120 determines the inputs and outputs of the source code block based on the signature and the unit test (block 222). The function assessor 122 determines the function of the source code block based on the unit test, the documentation, and the tokens (block 224). The tagger 124 tags the source code blocks with the inputs, outputs, and the function (block 226).

The syntax matcher 112 classifies the source code block based on the syntax (block 228). In addition, the catalog compiler 126 catalogs the source code block based on one or more of the classification from the syntax matcher 124 and/or the features tagged by the tagger 124 (block 230). The code block classifier 102 determines if another source code block is to be categorized (block 232). If another source code block is to be categorized, the program 200 continues with the code repository accessor 108 accessing the code repositories 106 (block 202) to select another source code block. If there is no further categorization of additional source code blocks (block 232), the program 200 ends.

FIG. 3 shows an example program 300 for automatically generating source code. In this context automatically generating source code includes the insertion of previously written source code blocks into source code being written or otherwise developed by a programmer. The program 300 includes the intent receiver 150 receiving intent of the programmer (block 302). The intent analyzer 152 identifies the desired function of the intent, the input, and the output (block 304). The code searcher 154 searches the catalog 128 of source code blocks (block 306). The code searcher 154 identifies a candidate source code block to match the desired function of the intent, the input, and the output (block 308).

The code evaluator 156 evaluates the candidate source code block to determine if features of the source code block match the desired function of the intent, the input, and the output (block 310). If the code evaluator 156 determines that there is a match of features of the source code block and the desired function of the intent, the input, and the output (block 312), the code inserter 158 inserts the source code block into the source code written or developed by the programmer. If the code evaluator 156 determines that there is no match of the features of the source code block and the desired function of the intent, the input, and the output (block 312), the code searcher 154 searches the catalog 128 for another candidate source code block to match to the desired function of the intent, the input, and the output (block 316).

The code searcher 154 identifies a candidate source code block to partially match the desired function of the intent, the input, and the output (block 318). A partially matching source code block may match one or two of the desired function of the intent, the input, and/or the output. The code evaluator 156 evaluates the candidate source code block for partial matching with the desired function of the intent, the input, and/or the output (block 320).

If the code evaluator 156 determines that the elements or features of the candidate source code partially match the desired function of the intent, the input, and/or the output (block 322), the code searcher 154 searches the catalog 128 and identifies supplemental source code to satisfy the desired function of the intent, the input, and the output when combined with the partially matching candidate source code block (block 324). The code inserter 158 inserts the partially matching candidate source code block and the supplemental source code into the source code written or developed by the programmer (block 314).

If the code evaluator 156 determines that the elements of the candidate source code do not partially match the desired function of the intent, the input, and/or the output (block 322), the automatic code generator 104 determines if another attempt is to be made to identify a partially matching source code block (block 326). If another attempt to identify a partially matching source code block is to be made (block 326), the program 300 continues with the code searcher 154 searching the catalog 128 for a source code block with elements that at least partially match the desired function of the intent, the input, and/or the output (block 316). If the automatic code generator 104 determines that another attempt to identify a partially matching source code block is not to be made (block 326), the automatic code generator 104 notifies the programmer of the inability to satisfy the intent automatically (block 328).

After the matching source code block or the partially matching source code block and the supplemental source code are inserted into the source code written or otherwise developed by the programmer (block 314) and/or after notifying the programmer of the inability to automatically generate source code to satisfy the intent (block 328), the automatic code generator 104 determines if there is additional intent to satisfy (block 330). If there is additional intent to satisfy (block 330), the program 300 continues with the intent analyzer 152 identifying the desired function of the intent, the input, and/or the output (block 304). If there is no additional intent to satisfy (block 330), the program 300 ends.

Figure 4:
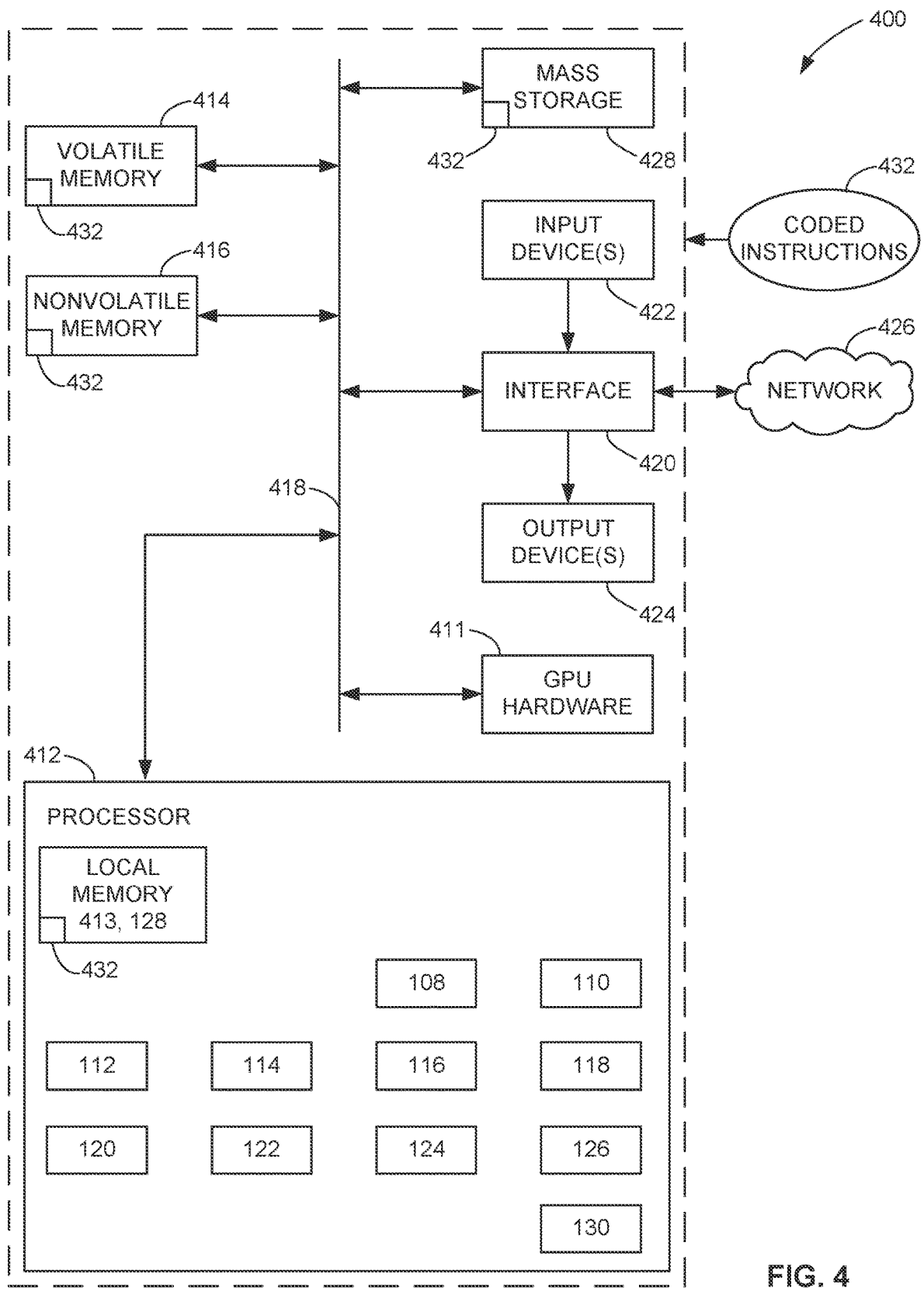
FIG. 4 is a block diagram of an example processing platform structured to execute the instructions of FIG. 2 to implement the example code block classifier of FIG. 1.

FIG. 4 is a block diagram of an example processor platform 400 structured to execute the instructions of FIG. 2 to implement the code block classifier 102 of FIG. 1. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 412 implements the example code repository accessor 108, the example filter 110, the example syntax matcher 112, the example signature generator 114, the example collateral miner 116, the example tokenizer 118, the example input/output determiner 120, the example function assessor 122, the example tagger 124, the example catalog compiler 126, and the example machine learning module 130.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 420 of the illustrated example, thus, typically includes a graphics driver card, a graphics driver chip, and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 2 may be stored in the mass storage device 428, in the volatile memory 414, in the non-volatile memory 416, and/or on a removable non-transitory computer readable storage medium such as a CD or DVD.

Figure 5:
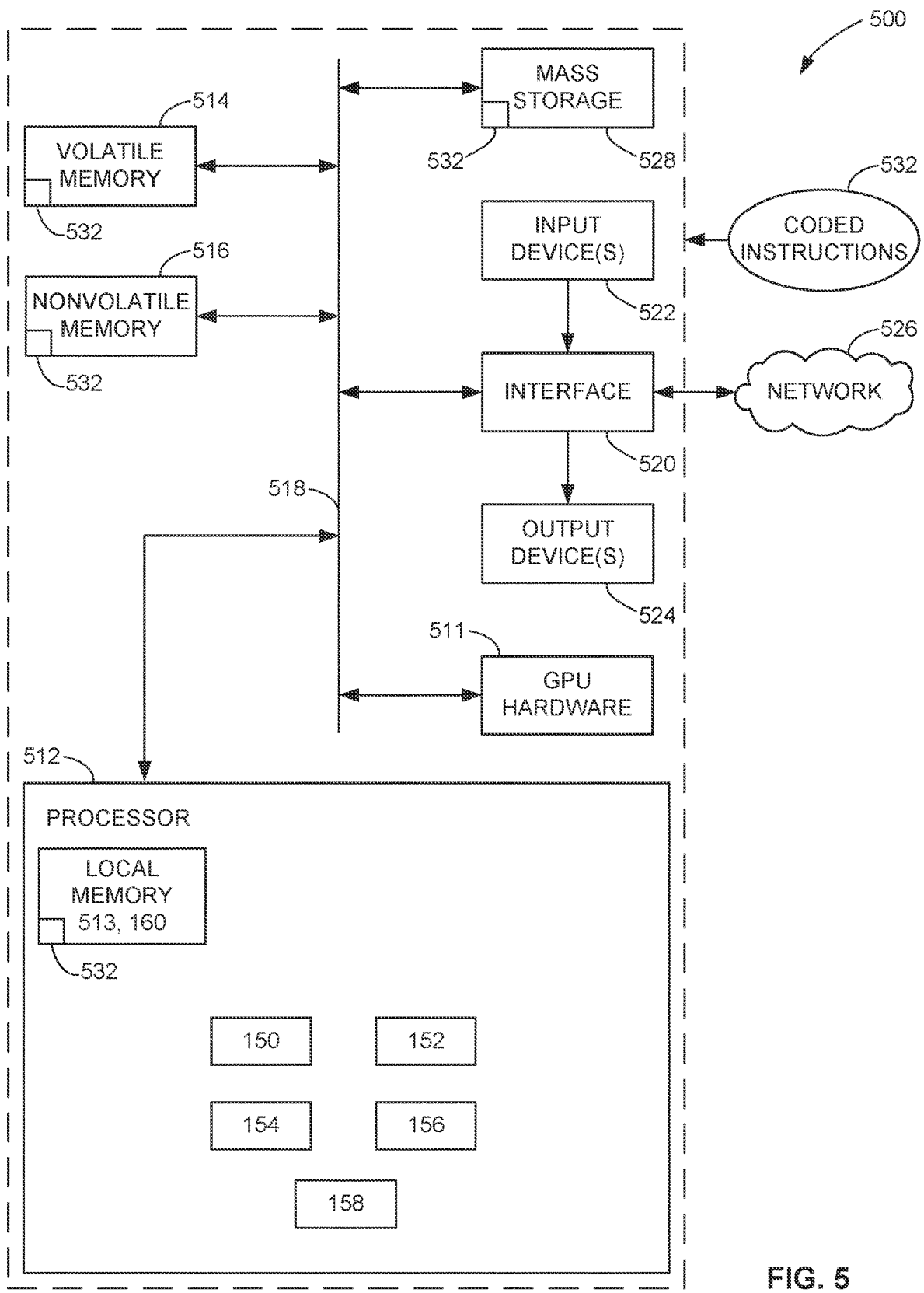
FIG. 5 is a block diagram of an example processing platform structured to execute the instructions of FIG. 3 to implement the example automatic code generator of FIG. 1.

FIG. 5 is a block diagram of an example processor platform 500 structured to execute the instructions of FIG. 3 to implement the automatic code generator 104 of FIG. 1. The processor platform 500 can be, for example, a server, a personal computer, a workstation, a self-learning machine (e.g., a neural network), a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs (including GPU hardware 511), DSPs, or controllers from any desired family or manufacturer. The hardware processor may be a semiconductor based (e.g., silicon based) device. In this example, the processor 512 implements the example intent receiver 150, the example intent analyzer 152, the example code searcher 154, the example code evaluator 156, and the example code inserter 158.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by SDRAM, DRAM, RDRAM®, and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a USB, a Bluetooth® interface, an NFC interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 524 are also connected to the interface circuit 520 of the illustrated example. The output devices 1024 can be implemented, for example, by display devices (e.g., an LED, an OLED, an LCD, a CRT display, an IPS display, a touchscreen, etc.), a tactile output device, a printer, and/or speaker. The interface circuit 520 of the illustrated example, thus, typically includes a graphics driver card, a graphics driver chip, and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a DSL connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and DVD drives.

The machine executable instructions 532 of FIG. 3 may be stored in the mass storage device 528, in the volatile memory 514, in the non-volatile memory 516, and/or on a removable non-transitory computer readable storage medium such as a CD or DVD.

From the foregoing, it will be appreciated that example apparatus, devices, systems, methods, and articles of manufacture have been disclosed that automatically program machines based on a programmer's intent. The programmer can be a human or a machine, and the examples disclosed herein access and analyze repositories of source code blocks to select one or more source code blocks for generation or insertion into source code being developed by the programmer. The source code blocks are selected to fulfill the intent of the programmer.

Automatic programming facilitates the development of machine programming by reducing the time required for traditional source code development. In the examples disclosed herein, the intent-based programming is more efficient and effective coding by auto-generating blocks of source code after identifying a programmer's intent and without requiring wholesale creation of source code by the programmer. The intent-based programming also accomplishes the generation of source code blocks without the relatively larger volume of detail needed to match syntax of the source code being developed by the programmer with pre-generated source code blocks. Thus, the disclosed apparatus, devices, systems, methods, and articles of manufacture improve the efficiency of programming a machine. The disclosed apparatus, devices, systems, methods, and articles of manufacture are accordingly directed to one or more improvement(s) in the functioning of a computer or other programmable machine.

Example 1 disclosed herein includes a system to categorize source code blocks that includes a code repository accessor to access a code repository and select a source code block. The example system also includes a signature generator to generate a signature for the source code block, a collateral miner to extract collateral associated with the source code block, and a tokenizer to transform the source code block into tokens. In addition, the example system includes a function assessor to determine a function of the source code block based on the collateral and the tokens and an input/output determiner to determine an input and an output of the source code block based on the collateral and the signature. The example system further includes a tagger to categorize the source code block with the function, input, and output.

Example 2 includes the system of Example 1, wherein the collateral includes a first type of collateral and a second type of collateral, the function based on the first type of collateral and the input and output of the source code based on the second type of collateral.

Example 3 includes the system of Example 2, wherein the first type of collateral is a unit test.

Example 4 includes the system of Example 2, wherein the second type of collateral is documentation.

Example 5 includes a system to automatically generate source code. The example system includes an intent receiver to receive intent of a programmer developing source code and an intent analyzer to determine a desired function, input, and output of the intent. The example system also includes a code searcher to search a repository of source code blocks, the source codes blocks categorized with respective functions, inputs, and outputs. The code searcher also is to identify a candidate source code block to match the desired function, input, and output based on the categorized function, input, and output of the candidate source code block. The example system also includes a code evaluator to determine if the categorized function, input, and output of the candidate source code block matches the desired function, input, and output of the intent. The example system also includes a code inserter to insert the candidate source code block when the categorized function, input, and output of the candidate source code block matches the desired function, input, and output of the intent.

Example 6 includes the system of Example 5, wherein the candidate source code block is a first candidate source code block, and when the code evaluator determines that at least one of the categorized function, input, or output of the candidate source code block does not match at least one of the desired function, input, or output of the intent, the code searcher is to identify a second candidate source code block to partially match the desired function, input, and output based on the categorized function, input, and output of the candidate source code block.

Example 7 includes the system of Example 6, wherein the code evaluator is to determine if one or two of the categorized function, input, and output of the second candidate source code block matches at least one or two of the desired function, input, and output of the intent. When one or two of the categorized function, input, and output of the second candidate source code block matches at least one or two of the desired function, input, and output of the intent, the code evaluator is to identify the element of intent not satisfied by the second candidate source code block, the code searcher is to find a supplement source code block to satisfy the missing element, and the code inserter is to insert the second candidate source code block and the supplement source code block.

Example 8 includes the system of Example 5, wherein the programmer is a machine.

Example 9 includes a system to categorize source code blocks. The example system includes means for selecting a source code block from a code repository, means for generating a signature for the source code block, means for mining collateral associated with the source code block, means for tokenizing the source code block into tokens, means for determining a function of the source code block based on the collateral and the tokens, means for determining an input and an output of the source code block based on the collateral and the signature, and means for categorizing the source code block with the function, input, and output.

Example 10 includes the system of Example 9, wherein the collateral includes a first type of collateral and a second type of collateral, the function based on the first type of collateral and the input and output of the source code based on the second type of collateral.

Example 11 includes the system of Example 10, wherein the first type of collateral is a unit test.

Example 12 includes the system of Example 10, wherein the second type of collateral is documentation.

Example 13 includes a system to automatically generate source code. The example system includes means for receiving intent of a programmer developing source code and means for analyzing the intent to determine a desired function, input, and output of the intent. The example system also includes means for identifying a candidate source code block from a repository of source code blocks, the candidate source code block to match the desired function, input, and output based on the categorized function, input, and output of the candidate source code block. The example system also includes means for evaluating source code to determine if the categorized function, input, and output of the candidate source code block matches the desired function, input, and output of the intent. The example system also includes means for inserting the candidate source code block when the categorized function, input, and output of the candidate source code block matches the desired function, input, and output of the intent.

Example 14 includes the system of Example 13, wherein the candidate source code block is a first candidate source code block, and when the means for evaluating source code determines that at least one of the categorized function, input, or output of the candidate source code block does not match at least one of the desired function, input, or output of the intent, the means for identifying is to identify a second candidate source code block to partially match the desired function, input, and output based on the categorized function, input, and output of the candidate source code block.

Example 15 includes the system of Example 14, wherein the means for evaluating source code is to determine if one or two of the categorized function, input, and output of the second candidate source code block matches at least one or two of the desired function, input, and output of the intent. When one or two of the categorized function, input, and output of the second candidate source code block matches at least one or two of the desired function, input, and output of the intent: the means for evaluating source code is to identify the element of intent not satisfied by the second candidate source code block; the means for identifying is to find a supplement source code block to satisfy the missing element; and the means for inserting is to insert the second candidate source code block and the supplement source code block.

Example 16 includes the system of Example 13, wherein the programmer is a machine.

Example 17 includes a non-transitory computer readable storage medium comprising computer readable instructions that, when executed, cause one or more processors to, at least: access a code repository; select a source code block; generate a signature for the source code block; extract collateral associated with the source code block; transform the source code block into tokens; determine a function of the source code block based on the collateral and the tokens; determine an input and an output of the source code block based on the collateral and the signature; and categorize the source code block with the function, input, and output.

Example 18 includes the medium of Example 17, wherein the collateral includes a first type of collateral and a second type of collateral, the function based on the first type of collateral and the input and output of the source code based on the second type of collateral.

Example 19 includes the medium of Example 18, wherein the first type of collateral is a unit test.

Example 20 includes the medium of Example 18, wherein the second type of collateral is documentation.

Example 21 includes a non-transitory computer readable storage medium comprising computer readable instructions that, when executed, cause one or more processors to, at least: determine a desired function, input, and output of an intent received from a programmer developing source code; search a repository of source code blocks, the source code blocks categorized with respective functions, inputs, and outputs; identify a candidate source code block to match the desired function, input, and output based on the categorized function, input, and output of the candidate source code block; determine if the categorized function, input, and output of the candidate source code block matches the desired function, input, and output of the intent; and insert the candidate source code block when the categorized function, input, and output of the candidate source code block matches the desired function, input, and output of the intent.

Example 22 includes the medium of Example 21, wherein the candidate source code block is a first candidate source code block, and when at least one of the categorized function, input, or output of the candidate source code block does not match at least one of the desired function, input, or output of the intent, the instructions further cause the one or more processors to identify a second candidate source code block to partially match the desired function, input, and output based on the categorized function, input, and output of the candidate source code block.

Example 23 includes the medium of Example 22, wherein the instructions further cause the one or more processors to determine if one or two of the categorized function, input, and output of the second candidate source code block matches at least one or two of the desired function, input, and output of the intent; and when one or two of the categorized function, input, and output of the second candidate source code block matches at least one or two of the desired function, input, and output of the intent, the instructions further cause the one or more processors to: identify the element of intent not satisfied by the second candidate source code block; find a supplement source code block to satisfy the missing element; and insert the second candidate source code block and the supplement source code block.

Example 24 includes the medium of Example 21, wherein the programmer is a machine.

Example 25 includes an apparatus that includes memory including machine reachable instructions; and processor circuitry to execute the instructions to: access a code repository; select a source code block; generate a signature for the source code block; extract collateral associated with the source code block; transform the source code block into tokens; determine a function of the source code block based on the collateral and the tokens; determine an input and an output of the source code block based on the collateral and the signature; and categorize the source code block with the function, input, and output.

Example 26 includes the apparatus of Example 25, wherein the collateral includes a first type of collateral and a second type of collateral, the function based on the first type of collateral and the input and output of the source code based on the second type of collateral.

Example 27 includes the apparatus of Example 26, wherein the first type of collateral is a unit test.

Example 28 includes the apparatus of Example 26, wherein the second type of collateral is documentation.

Example 29 includes an apparatus that includes memory including machine reachable instructions; and processor circuitry to execute the instructions to: determine a desired function, input, and output of an intent received from a programmer developing source code; search a repository of source code blocks, the source code blocks categorized with respective functions, inputs, and outputs; identify a candidate source code block to match the desired function, input, and output based on the categorized function, input, and output of the candidate source code block; determine if the categorized function, input, and output of the candidate source code block matches the desired function, input, and output of the intent; and insert the candidate source code block when the categorized function, input, and output of the candidate source code block matches the desired function, input, and output of the intent.

Example 30 includes the apparatus of Example 29 wherein the candidate source code block is a first candidate source code block, and when at least one of the categorized function, input, or output of the candidate source code block does not match at least one of the desired function, input, or output of the intent, the processor circuitry is to execute the instructions to identify a second candidate source code block to partially match the desired function, input, and output based on the categorized function, input, and output of the candidate source code block.

Example 31 includes the apparatus of Example 29, wherein the processor circuitry is to determine if one or two of the categorized function, input, and output of the second candidate source code block matches at least one or two of the desired function, input, and output of the intent; and when one or two of the categorized function, input, and output of the second candidate source code block matches at least one or two of the desired function, input, and output of the intent, the processor circuitry is to: identify the element of intent not satisfied by the second candidate source code block; find a supplement source code block to satisfy the missing element; and insert the second candidate source code block and the supplement source code block.

Example 32 includes the apparatus of Example 29, wherein the programmer is a machine.

Example 33 includes a method for categorizing source code blocks. The example method includes selecting, by executing instructions with a processor, a source code block from a code repository; generating, by executing instructions with the processor, a signature for the source code block; extracting, by executing instructions with the processor, collateral associated with the source code block; transforming, by executing instructions with the processor, the source code block into tokens; determining, by executing instructions with the processor, a function of the source code block based on the collateral and the tokens; determining, by executing instructions with the processor, an input and an output of the source code block based on the collateral and the signature; and categorizing, by executing instructions with the processor, the source code block with the function, input, and output.

Example 34 includes the method of Example 33, wherein the collateral includes a first type of collateral and a second type of collateral, the function based on the first type of collateral and the input and output of the source code based on the second type of collateral.

Example 35 includes the method of Example 34, wherein the first type of collateral is a unit test.

Example 36 includes the method of Example 34, wherein the second type of collateral is documentation.

Example 37 includes a method for automatically generating source code. The example method includes determining, by executing instructions with a processor, a desired function, input, and output of an intent received from a programmer developing source code; searching, by executing instructions with the processor, a repository of source code blocks, the source code blocks categorized with respective functions, inputs, and outputs; identifying, by executing instructions with the processor, a candidate source code block to match the desired function, input, and output based on the categorized function, input, and output of the candidate source code block; determining, by executing instructions with the processor, if the categorized function, input, and output of the candidate source code block matches the desired function, input, and output of the intent; and inserting, by executing instructions with the processor, the candidate source code block when the categorized function, input, and output of the candidate source code block matches the desired function, input, and output of the intent.

Example 38 includes the method of Example 37, wherein the candidate source code block is a first candidate source code block, and when at least one of the categorized function, input, or output of the candidate source code block does not match at least one of the desired function, input, or output of the intent, the method further includes identifying, by executing instructions with the processor, a second candidate source code block to partially match the desired function, input, and output based on the categorized function, input, and output of the candidate source code block.

Example 39 includes the method of Example 38, and further includes determining, by executing instructions with the processor, if one or two of the categorized function, input, and output of the second candidate source code block matches at least one or two of the desired function, input, and output of the intent; and when one or two of the categorized function, input, and output of the second candidate source code block matches at least one or two of the desired function, input, and output of the intent: identifying, by executing instructions with the processor, the element of intent not satisfied by the second candidate source code block; finding, by executing instructions with the processor, a supplement source code block to satisfy the missing element; and inserting, by executing instructions with the processor, the second candidate source code block and the supplement source code block.

Example 40 includes the method of Example 37, wherein the programmer is a machine.

Although certain example methods, apparatus and articles of manufacture have been disclosed herein, the scope of coverage of this patent is not limited thereto. On the contrary, this patent covers all apparatus, devices, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable storage medium comprising computer readable instructions to cause at least one processor circuit to, at least:
   access text representative of a desired functionality of a function, a desired input to the function, and a desired output of the function;
   generate a candidate response based on execution of a machine learning model using the text as a textual input to the machine learning model, the candidate response including executable program code;
   identify a supplemental source code in response to at least one of the candidate response having an input that does not match the desired input, or the candidate response having an output that does not match the desired output, the supplemental source code to complete the candidate response with respect to the at least one of the desired input or the desired output; and
   insert the candidate response and the supplemental source code into source code.

2. The non-transitory computer readable storage medium of claim 1, wherein the candidate response is to cause inclusion of a reference to a library in the source code.

3. The non-transitory computer readable storage medium of claim 1, wherein the computer readable instructions are to cause one or more of the at least one processor circuit to generate the candidate response based on an expected input to the executable program code.

4. The non-transitory computer readable storage medium of claim 1, wherein the computer readable instructions are to cause one or more of the at least one processor circuit to generate the candidate response based on an expected output of the executable program code.

5. The non-transitory computer readable storage medium of claim 1, wherein the text is in a natural language.

6. A method for development of source code, the method comprising:
   receiving text representative of a desired functionality of a function, a desired input to the function, and a desired output of the function;
   generating, by executing an instruction with at least one processor, a candidate response based on execution of a machine learning model using the text as a textual input to the machine learning model, the candidate response including executable program code;
   identifying a supplemental source code in response to at least one of the candidate response having an input that does not match the desired input, or the candidate response having an output that does not match the desired output, the supplemental source code to complete the candidate response with respect to the at least one of the desired input or the desired output; and inserting, by executing an instruction with at least one processor, the candidate response and the supplemental source code into the source code.

7. The method of claim 6, wherein the candidate response is to cause inclusion of a reference to a library in the source code.

8. The method of claim 6, further including generating the candidate response based on an expected input to the executable program code.

9. The method of claim 6, further including generating the candidate response based on an expected output of the executable program code.

10. The method of claim 6, wherein the text is not in a programming language.

11. The method of claim 6, wherein the text is in a natural language.

12. An apparatus comprising:
interface circuitry;
machine-readable instructions; and
at least one processor circuit to be programmed by the machine-readable instructions to:
receive text to identify an inferred functionality of a function, an inferred input to the function, and an inferred output of the function;
generate a candidate response based on execution of a machine learning model using the text as a textual input to the machine learning model, the candidate response including executable program code;
identify a supplemental source code in response to at least one of the candidate response having an input that does not match the inferred input, or the candidate response having an output that does not match the inferred output, the supplemental source code to complete the candidate response with respect to the at least one of the inferred input or the inferred output; and
insert the candidate response and the supplemental source code into source code.

13. The apparatus of claim 12, wherein the candidate response is to cause inclusion of a reference to a library in the source code.

14. The apparatus of claim 12, wherein one or more of the at least one processor circuit is to generate the candidate response based on an expected input to the executable program code.

15. The apparatus of claim 12, wherein one or more of the at least one processor circuit is to generate the candidate response based on an expected output of the executable program code.

16. The apparatus of claim 12, wherein the text is not in a computer readable language.

17. The apparatus of claim 12, wherein the text is not in a programming language.

18. The apparatus of claim 12, wherein the text is in a natural language.

19. The non-transitory computer readable storage medium of claim 1, wherein the candidate response further includes a unit test.

20. The non-transitory computer readable storage medium of claim 1, wherein the candidate response is to fulfill an intent of the text.

21. The non-transitory computer readable storage medium of claim 1, wherein the computer readable instructions are to cause one or more of the at least one processor circuit to insert the candidate response and the supplemental source code into the source code.

* * * * *